(12) United States Patent
Ewe et al.

(10) Patent No.: US 12,370,815 B2
(45) Date of Patent: Jul. 29, 2025

(54) PRINT MEDIA ROLLERS

(71) Applicant: Hewlett-Packard Development Company, L.P., Spring, TX (US)

(72) Inventors: Michael Ewe, Vancouver, WA (US); Keith Jariabka, Vancouver, WA (US); Juan D Ramos, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 224 days.

(21) Appl. No.: 18/032,874

(22) PCT Filed: Oct. 21, 2020

(86) PCT No.: PCT/US2020/056581
§ 371 (c)(1),
(2) Date: Apr. 20, 2023

(87) PCT Pub. No.: WO2022/086514
PCT Pub. Date: Apr. 28, 2022

(65) Prior Publication Data
US 2023/0331006 A1    Oct. 19, 2023

(51) Int. Cl.
*B41J 11/00*    (2006.01)
*B65H 5/06*    (2006.01)
*B65H 7/02*    (2006.01)

(52) U.S. Cl.
CPC .......... *B41J 11/0095* (2013.01); *B65H 5/062* (2013.01); *B65H 7/02* (2013.01); *B65H 2511/13* (2013.01); *B65H 2513/10* (2013.01); *B65H 2701/1311* (2013.01)

(58) Field of Classification Search
CPC ........ B41J 11/0095; B65H 5/062; B65H 7/02; B65H 2513/13; B65H 2513/10; B65H 2701/1311
See application file for complete search history.

(56) References Cited

U.S. PATENT DOCUMENTS

| | | | |
|---|---|---|---|
| 8,707,898 B2 | 4/2014 | Wehr et al. | |
| 9,033,200 B2 | 5/2015 | De Jong et al. | |
| 2004/0041330 A1 | 3/2004 | Ko et al. | |
| 2013/0292899 A1* | 11/2013 | Mattern | B65H 5/062 271/145 |
| 2014/0079460 A1 | 3/2014 | Kanaya | |
| 2014/0205355 A1 | 7/2014 | Lo et al. | |
| 2017/0282606 A1 | 10/2017 | Yatsunami et al. | |
| 2018/0118481 A1 | 5/2018 | Sakurai | |
| 2018/0222705 A1 | 8/2018 | Hirano et al. | |
| 2018/0273333 A1 | 9/2018 | Kodama et al. | |
| 2019/0098157 A1 | 3/2019 | Nomoto | |

* cited by examiner

*Primary Examiner* — Thinh H Nguyen
(74) *Attorney, Agent, or Firm* — Brooks, Cameron & Huebsch, PLLC (57) ABSTRACT

Example implementations relate to print media rollers. For example, implementations can include a device that includes a first roller to receive print media, a first sensor to determine when a leading edge of the print media is at a first location, a second roller to be activated based on a type of the print media and when the leading edge of the print media interacts with the first sensor, a second sensor to determine when the leading edge of the print media is at a second location, wherein the first roller is deactivated based on when the leading edge of the print media interacts with the second sensor.

15 Claims, 5 Drawing Sheets

PRINT MEDIA ROLLERS

BACKGROUND

Printing devices can utilize rollers and/or motors to move print media from a first location to a second location within the printing device. For example, printing devices can utilize a system of rollers to move print media along a print media path. In this example, the print media path can be a path for print media to be moved from a media tray, to a print zone, and/or to an output tray. Printing devices can utilize scanning devices such as an image scanner assembly (ISAs) to digitize physical documents. For example, a scanning device can be utilized to scan a physical document and generate a digital copy of the physical document. In some examples, the printing devices and/or scanning devices can utilize rollers, motors, and/or gear trains to execute mechanical functions associated with the devices.

DETAILED DESCRIPTION

A printing device can include a physical printing device that can generate images on print media. As used herein, print media can include a medium to receive a print substance from the printing device. In some examples, the print substance can be utilized to generate images on the print medium by a print zone depositing the print substance on the print medium. In some examples, the print substance can include, but is not limited to: a liquid ink, a dry sublimation ink, a solvent ink, an ultraviolet light (UV) ink, a toner, and/or other material that can be deposited on to a print medium to generate an image on the print medium. The images generated on the print medium can include pictures, text, and/or other objects.

The printing device can include a print media path that can be utilized to transport the print media from a print media tray. As used herein, a print media tray can include a location of the printing device utilized to position print media to be utilized by the printing device. In some examples, the print media path can include a plurality of rollers and/or print media guides to move the print media to a print zone to allow the printing device to deposit the print substance on the print media. In some examples, the print media path can also be utilized to transport the print media from the print zone to an output tray that can be utilized to position or hold print media that has had a print operation performed by the print zone. In some examples, the plurality of rollers can be operated by drive motors and/or gear boxes that can be activated and deactivated to move or rotate the plurality of rollers. In addition, the speed of the rollers can be altered utilizing a corresponding drive motor and/or gear box.

Different types of print media can have a plurality of different properties. For example, different types of print media can have different thicknesses, coatings, absorption rates, stiffness, among other features. In some examples, the type of print media can alter a performance or ability of the plurality of rollers to move the print media. For example, a relatively thicker print media may be more difficult to move with the plurality of rollers. In this example, previous systems may increase a pressure or torque of the plurality of rollers to move the relatively thicker print media through the print media path. In other examples, previous systems may use a different print media path for media that exceeds a particular thickness threshold.

The present disclosure relates to print media rollers to move print media around a corner of a print media path. In some examples, a corner of the print media path can be utilized to move print media from a first direction to a second direction. To reduce an overall footprint of a printing device, a corner of the print media path may utilize a relatively small angle to reduce the quantity of space that the corner of the print media path takes up within the printing device. That is, the corner of the print media path may be a relatively tighter or more compact corner. In some examples, the present disclosure can determine when a print medium to be utilized by the printing device is greater than a print thickness threshold and utilize a turn roller to move the print medium through a corner of the print media path.

In some examples, the printing device can include a pick roller and/or separation roller coupled to a first drive motor to move print media from a print media tray to the corner of the print media path. In these examples, a sensor can indicate when the print media is approaching the turn and/or turn roller. Furthermore, in these examples, the turn roller can be coupled to a second drive motor that is activated in response to the sensor indicating that the print media is approaching the turn roller. In this way, the turn roller can be independently driven to more precisely and more consistently move the relatively thicker print media through the corner of the print media path, even when the corner of the print media path is relatively tight (e.g., sharp, compact, small angle, etc.) and/or includes a scanning device.

Figure 1:
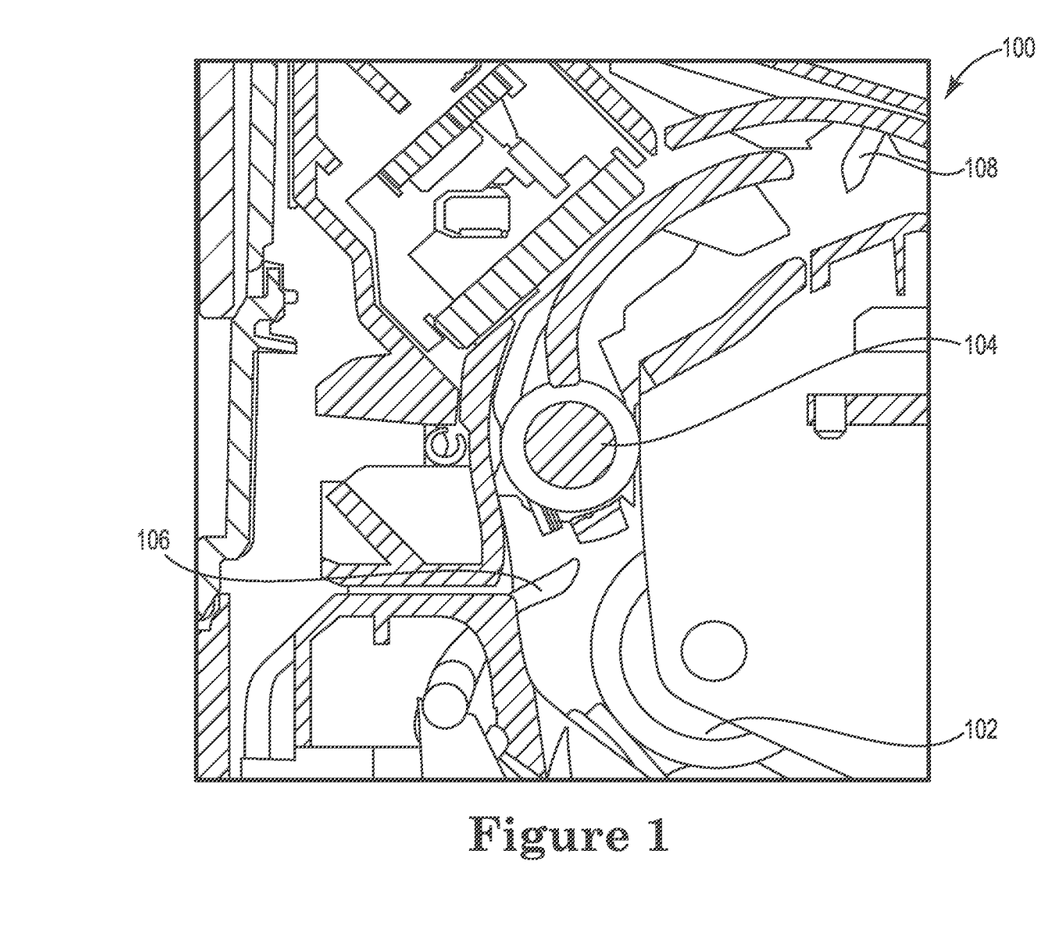
FIG. 1 illustrates an example of a device that utilizes print media rollers, in accordance with the present disclosure.

FIG. 1 illustrates an example of a device 100 that utilizes print media rollers (e.g., first roller 102, second roller 104, etc.), in accordance with the present disclosure. In some examples, the device 100 can be a portion of a printing device. As described herein, a printing device can include a print zone to deposit a print substance on a print medium to generate an image on the print medium. In some examples, the device 100 can include a portion of a print media path that can be utilized to move print media from a print media tray to a print zone of the printing device.

In some examples, the device 100 can include a first roller 102. The first roller 102 can be a separation roller. As used herein, a separation roller can include a roller to separate sheets of print media to ensure that a single sheet of print media is provided to the print media path at a time. In some examples, the first roller 102 can be rotated or moved utilizing a drive motor coupled to the first roller 102. As used herein, a drive motor can include a mechanical device used to power a device. In some examples, the drive motor can be an electric motor that is coupled to a gear box, clutch, or other mechanical devices to provide the first roller 102 with different rotational speed, rotational torque, and/or rotational direction. In some examples, the first roller 102 can be rotated by a first drive motor that is different than a drive motor (e.g., second drive motor, etc.) utilized to drive the second roller 104.

In some examples, the first roller 102 can provide print media past a first sensor 106 to a second roller 104. In some examples, the first roller 102 can move a leading edge of the print media to interact with the first sensor 106. As used herein, a leading edge of the print media can include an edge of the print media in the direction of movement of the print media. For example, the leading edge of the print media can interact with rollers, sensors, or other devices prior to other surfaces or edges of the print media. As used herein, a first sensor 106 can include a device that can determine when the print media reaches a particular location within the print media path. In some examples, the first sensor 106 can be a proximity sensor or flag sensor to determine when the leading edge of the print media is at a location between the first roller 102 and the second roller 104. In some examples, the first sensor 106 can be positioned at a location between the first roller 102 and the second roller 104 to allow the second roller 104 to be activated in time to interact with the print media.

In some examples, the second roller 104 can be activated (e.g., started, etc.) when the first sensor 106 interacts or detects the leading edge of the print media. In some examples, the second roller 104 can be activated when the print media is determined to be a particular type of print media and when the first sensor 106 detects the leading edge of the particular type of print media. In some examples, the first roller 102 can remain activated when the second roller 104 is activated. As described herein, the particular type of print media can include particular properties. In some examples, the particular type of print media includes print media that exceeds a thickness threshold. As described herein, particularly thick print media can be difficult to transport around curves since the relatively thick print media can be stiffer or have other properties that make it harder to bend around the curve. In some examples, a media type sensor can be utilized to determine when the print media is the particular type of print media. In some examples, the particular type of print media can exceed a thickness threshold.

Thus, when the print media exceeds the thickness threshold, the second roller 104 can be activated when the print media is detected by the first sensor 106 to help move the print media through the corner of the print media path. In some examples, the second roller 104 can be activated based on a determination of a first type of print media and not activated based on a determination of a second type of print media. For example, the second roller 104 can be activated when the print media is determined to have a thickness that is greater than a thickness threshold and not activated when the print media is determined to have a thickness that is less than the thickness threshold. In other examples, the second roller 104 can be activated to receive the print media through the corner despite a thickness of the print media. For example, the second roller 104 can be activated to receive print media from the first roller 102 to ensure the print media reaches a roller further along the print media path.

In some examples, the second roller 104 can be coupled to a second drive motor that is separate than the first drive motor coupled to the first roller 102. In this way, the second roller 104 can be independently controlled from the first roller 102. For example, a controller coupled to the first drive motor and the second drive motor can independently activate the first roller 102 and the second roller 104. In a similar way, the controller can be utilized to alter a speed of the first roller 102 independent of the second roller 104. For example, the second roller 104 can operate at a different speed than the first roller 102. In some examples, the second roller 104 can operate at a speed that is greater than the speed of the first roller 102. In this way, the second roller 104 can be utilized to help move relatively thicker print media through the corner of the print media path.

In some examples, the first roller 102 and the second roller 104 can be differently sized rollers. For example, the first roller 102 can include a diameter that is a first length and the second roller 104 can include a diameter that is a second length. In some examples, the first length of the first roller 102 can be greater than the second length of the second roller. In a specific example, the first roller 102 can have a diameter between 10 millimeters and 15 millimeters while the second roller 104 can have a diameter between 6 millimeters and 8 millimeters. In some examples, the relatively smaller second roller 104 can allow the corner of the media path to have a lower angle and/or sharper curve compared to devices that utilize a larger roller. In some examples, the relatively smaller second roller 104 can provide relatively less torque on the print media as it passes through the second roller 104. However, the combination of the first roller 102 and the second roller 104 can provide enough torque to provide the print media through the corner of the media path even when the corner of the media path includes a lower angle and/or sharper curve.

In some examples, the device 100 can include a second sensor 108 that can be positioned between the second roller 104 and a print zone of the printing device. In some examples, the first sensor 106 can be utilized to determine when the leading edge of the print media is entering the corner or turn of the print media path and the second sensor 108 can be utilized to determine when the leading edge of the print media is exiting the corner or turn of the print media path. That is, the first sensor 106 can be positioned at a start of a corner of a print media path and the second sensor 108 can be positioned at an end of a corner of the print media path. In some examples, the second sensor 108 can be the same type or similar type of sensor as the first sensor 106. That is, the second sensor 108 can be a proximity sensor or flag sensor that can be utilized to detect the presence or absence of the print media at a particular location within the print media path. As described further herein, the corner of the print media path can include an inline scanning device positioned between the second roller 104 and the second sensor 108.

In some examples, the second sensor 108 can be utilized to deactivate the first roller 102. For example, the second sensor 108 can detect a leading edge of the print media and a controller can be utilized to deactivate the first roller 102 in response to the detection of the leading edge of the print media at a location of the second sensor 108. In some examples, deactivating the first roller 102 can include deactivating a drive motor coupled to the first roller 102. In some examples, the second roller 104 can continue to be activated when the first roller 102 is deactivated. In other examples, the second roller 104 can be deactivated at a later time to ensure that the trailing edge of the print media is driven through the corner or turn of the print media path. In this way, the device 100 can be utilized to provide relatively thick print media through a corner or turn of the print media path of a printing device.

Figure 2:
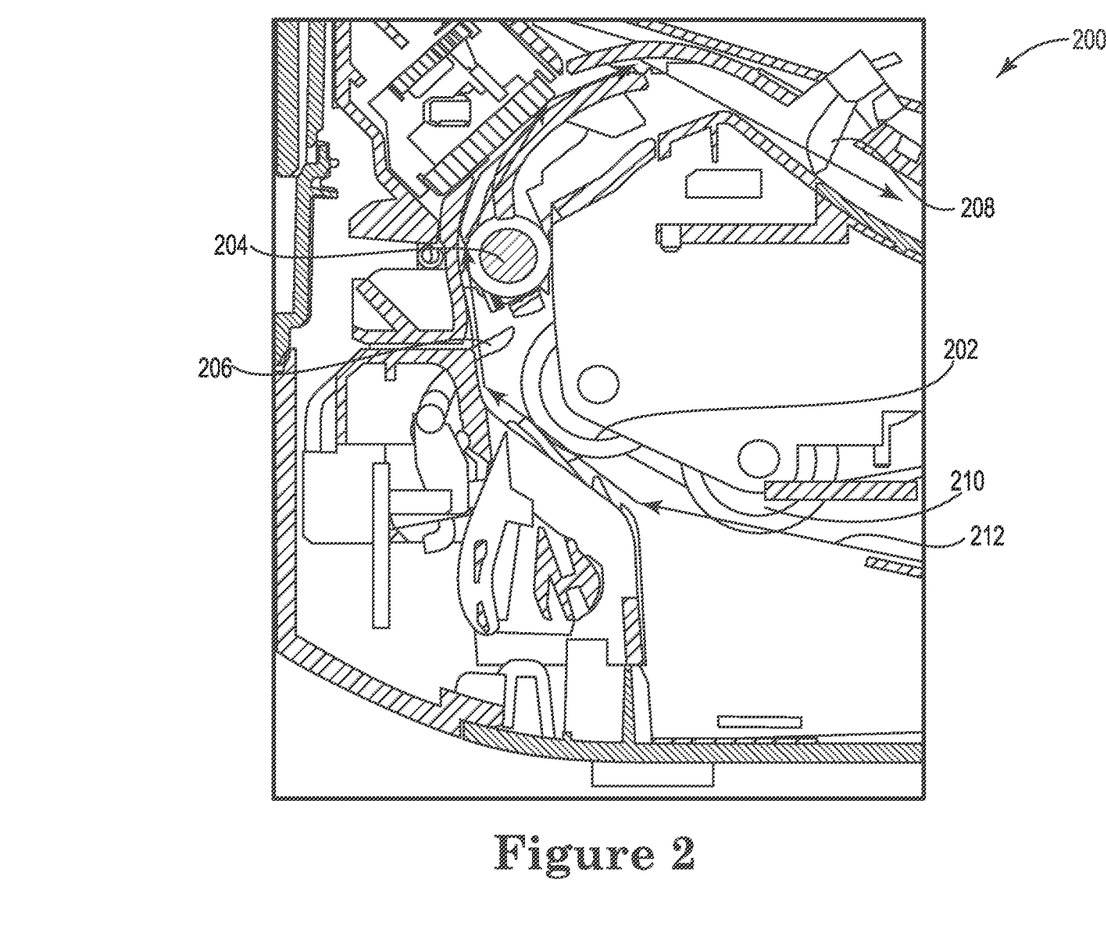
FIG. 2 illustrates an example of a device that utilizes print media rollers, in accordance with the present disclosure.

FIG. 2 illustrates an example of a device 200 that utilizes print media rollers, in accordance with the present disclosure. In some examples, the device 200 can include the same or similar elements as device 100 as referenced in FIG. 1. For example, the device 200 can include a portion of a print media path 212 that includes a first roller 202, a second roller 204, a first sensor 206, and a second sensor 208. In some examples, the device 200 can include a portion of the print media path 212 that includes a curve or turn from a first direction to a second direction. For example, the third roller 210 can move print media to the first roller 202 in a first direction and the second roller 204 can move the print media through the corner to a second direction along the print media path 212.

In some examples, the third roller 210 can be a pick roller to interact with print media positioned within a print media tray. In some examples, the third roller 210 can be utilized to move print media from the print media tray to the print media path 212. The third roller 210 can rotate to move the print media to the first roller 202. As described herein, the first roller 202 can be a separation roller to ensure that a single sheet of print media is moved to the second roller 204 along the print media path 212. In some examples, the first roller 202 and the third roller 210 can be coupled to a first drive motor and/or gear box. In this way, the first roller 202 and third roller 210 can be activated or deactivated by activating or deactivating the first drive motor. In other examples, the first roller 202 and the third roller 210 can be coupled to a clutch device to allow the first roller 202 and/or the third roller 210 to spin freely when deactivated. As used herein, a clutch device can include a mechanical device for connecting or disconnecting a roller (e.g., first roller 202, third roller 210, etc.) from a drive motor. In this way, the drive motor may not prevent the first roller and/or the third roller 210 from freely spinning, which can apply resistance on the print media when a different roller is applying force on the print media.

In some examples, the second roller 204 can be a turn roller that can be utilized to provide additional force on print media as the print media moves through the turn or corner of the print media path 212. In some examples, the second roller 204 can be coupled to a second drive motor that is different than the first drive motor. In this way, the second roller 204 can be activated independently from the first roller 202 and/or the third roller 210. In addition, the second roller 204 can continue to rotate utilizing the second drive motor even when the first roller 202 and/or third roller 210 are deactivated or freely spinning utilizing the clutch device. In this way, the second roller 204 can continue to rotate and apply force on the print media to continue to move the print media along the print media path 212.

In some examples, the third roller 210 can be activated utilizing the first drive motor to pick a sheet of print media from a print media tray. The first roller 202 can ensure that a single sheet of print media was picked by the third roller 210. The first roller 202 and/or the third roller 210 can stay activated to move the print media toward the second roller 204. In some examples, a leading edge of the sheet of print media can be detected by the first sensor 206. As described herein, the first sensor 206 can be a proximity sensor to detect when a leading edge of the print media has reached a particular location of the print media path 212. In some examples, the first sensor 206 can be positioned between the first roller 202 and the second roller 204. In some examples, the first sensor 206 can be positioned at a start of a turn and/or curve of the print media path 212.

In some examples, the second roller 204 can be activated utilizing the second drive motor when the first sensor 206 detects the presence of the leading edge of the print media. In some examples, the first roller 202, second roller 204, and third roller 210 can be activated in parallel to move the print media through the turn of the print media path 212 toward the second sensor 208. In some examples, the first drive motor and second drive motor can be active in parallel to drive the first roller 202, second roller 204, and the third roller 210 in parallel. As described herein, the second sensor 208 can be the same or similar type of sensor as the first sensor 206. For example, the second sensor 208 can include a proximity sensor to determine when a leading edge of the print media is at a particular location. In some examples, the second sensor 208 can be positioned at an output of the turn and/or curve of the print media path 212.

In some examples, the first roller 202 and/or third roller 210 can be deactivated when the leading edge of the print media interacts with the second sensor 208. As described herein, the clutch device can be utilized to allow the first roller 202 and/or third roller 210 to spin freely when the first drive motor is deactivated. In some examples, the second roller 204 can continue to be activated utilizing the second drive motor to continue to move the print media through the turn or curve of the print media path 212. In some examples, the device 200 can be utilized to provide relatively thick print media through the print media path 212 by utilizing a separate drive motor to drive the second roller 204 even when the first roller 202 and the third roller 210 are deactivated.

Figure 3:
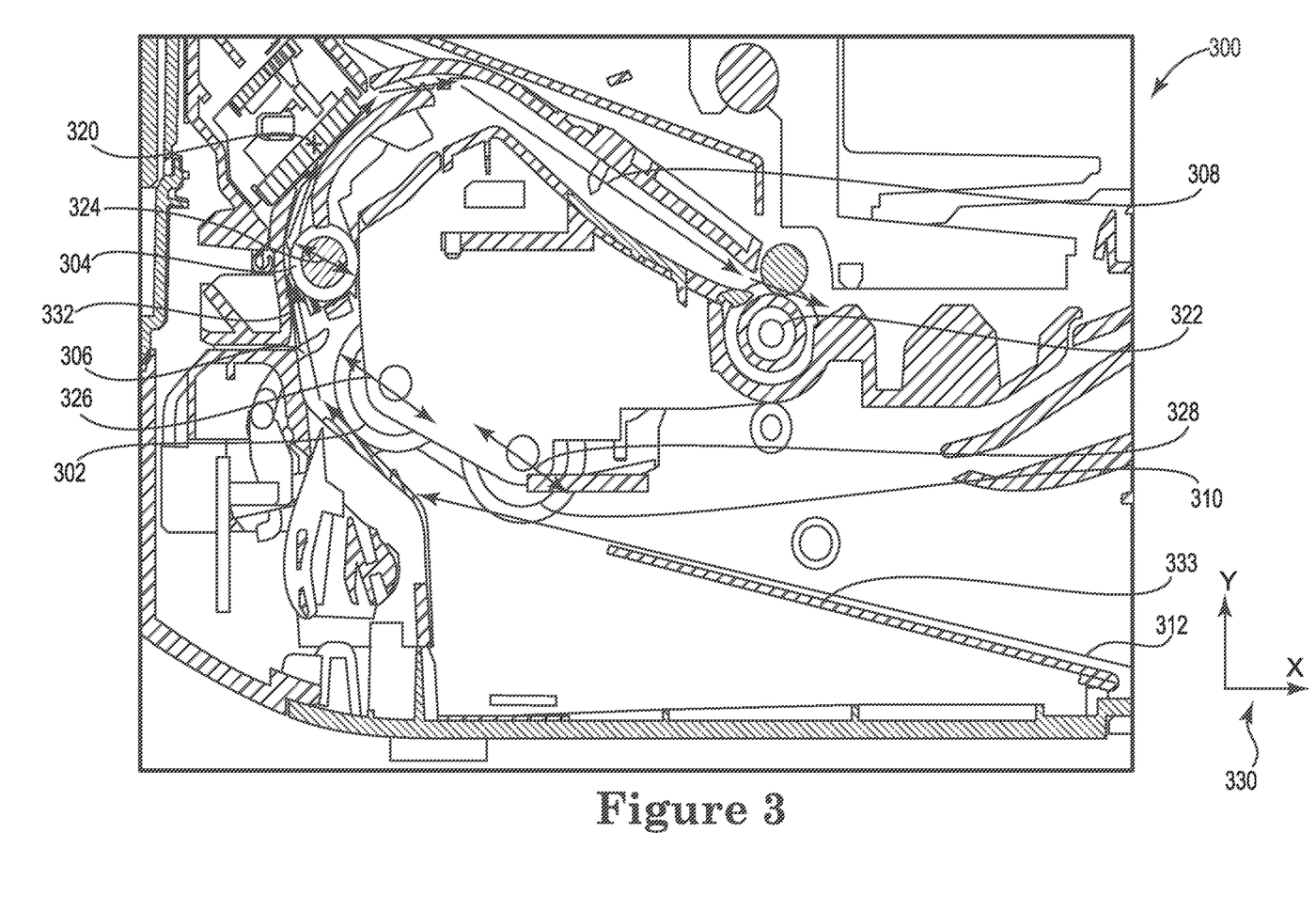
FIG. 3 illustrates an example of a device that utilizes print media rollers, in accordance with the present disclosure.

FIG. 3 illustrates an example of a device 300 that utilizes print media rollers, in accordance with the present disclosure. In some examples, the device 300 can include the same or similar elements as device 200 as referenced in FIG. 2, and/or device 100 as referenced in FIG. 1. For example, the device 300 can be a portion of a printing device. In some examples, the device 300 can include a print media tray 333 that can be utilized to store print media.

In some examples, the device 300 can include a pick roller 310 to pick print media from the print media tray 333 and a separation roller 302 to ensure that a single sheet of print media is provided to a print media path 312. In some examples, the separation roller 302 can be positioned between the first sensor 306 and a print media tray 333 storing print media and a turn roller 304 can be positioned between the first sensor 306 and the second sensor 308. In some examples, the pick roller 310 and the separation roller 302 can be utilized to direct the print media toward a turn roller 304 within the print media path 312. As described herein, a first sensor 306 can be positioned between the separation roller 302 and the turn roller 304 to detect the presence of a leading edge of the print media being transported through the print media path 312. When the leading edge of the print media is detected by the first sensor 306, the turn roller 324 can be activated. As described herein, the pick roller 310 and separation roller 302 can be driven by a separate drive motor than the turn roller 304. For example, the pick roller 310 and the separation roller 302 can be driven by a first drive motor and the turn roller 304 can be driven by a second drive motor that is separate from the first drive motor. That is, the first drive motor can be activated without activating the second drive motor and the second drive motor can be activated without activating the first drive motor.

In some examples, the separation roller 302 and media guides can be utilized to provide print media to the turn roller 304 in the direction of arrow 332. As used herein, media guides can be positioned on edges of the print media path 312 to ensure the print media stays within the print media path 312. In some examples, the direction of arrow 332 can be substantially vertical with a base of the printing device. For example, the print media can be provided to the turn roller 304 in the y direction as illustrated by a graph 330 when the base of the printing device is positioned along the x direction as illustrated by the graph 330. As described herein, the pick roller 310 and/or separation roller 302 can be driven at a first speed or first rotational speed and the turn roller 304 can be driven at a second speed or second rotational speed. For example, the turn roller 304 can be driven by the second drive motor at a relatively faster rotational speed than the pick roller 310 and/or the separation roller 302. In some examples, the turn roller 304 can be driven at a relatively faster rotational speed to move relatively thick print media through a curved portion of the print media path 312.

In some examples, the device 300 can include a scanning device 320 positioned in-line with the print media path 312. As used herein, an in-line scanning device, such as scanning device 320, can include a device capable of generating a digital image the print media as it passes though the print media path 312. In some examples, the scanning device 320 can be positioned at a curved portion or corner of the print media path 312. In these examples, the turn roller 304 can move the print media along the curved portion or corner of the print media path at a constant or substantially constant speed. For example, the turn roller 304 can move the print media through the print media path 312 such that the print media passes the scanning device 320 at a constant or substantially constant speed. In this example, a quality of a scan performed by the scanning device 320 may depend on a speed consistency of the print media as the print media passes the scanning device 320. In this way, the turn roller 304 can be utilized to increase a scan quality of a scan performed by the scanning device 320.

In some examples, the device 300 can include a second sensor 308. As described herein, the second sensor 308 can be the same or similar type of sensor as the first sensor 306. In some examples, the second sensor 308 can be positioned between the scanning device 320 and a feed roller 322. In some examples, the second sensor 308 can be utilized to determine when to deactivate the pick roller 310 and/or separation roller 302. In some examples, a clutch device can be utilized to allow the pick roller 310 and/or separation roller 302 to spin freely when the second sensor 308 detects the leading edge of the print media.

In some examples, deactivating the pick roller 310 and/or separation roller 302 can be deactivated when the leading edge of the print media is detected to prevent the pick roller 310 and/or separation roller 302 from interacting with the print media when the leading edge of the print media reaches or interacts with the feed roller 322. In some examples, the print media can be damaged when the pick roller 310 and/or separation roller 302 are interacting with the print media at the same time as the feed roller 322. In this way, the second sensor 308 can be utilized to determine when to activate the feed roller 322 and when to deactivate the pick roller 310 and/or separation roller 302.

In some examples, the pick roller 310 can be a first size 328, the separation roller 302 can be a second size 326, and the turn roller 304 can be a third size 324. In some examples, the first size 328 and the second size 326 can be the same, similar, or substantially the same diameter or size. In some examples, the third size 324 can be relatively smaller than the first size 328 and/or second size 326. In some examples, the third size 324 can be relatively smaller than the first size 328 and the second size 326. In combination, the separation roller 302 and turn roller 304 can provide enough torque to move the print media through the turn of the print media path 312. In addition, the relatively smaller size or diameter of the turn roller 304 can allow the turn roller 304 to be a non-coated roller. As used herein, a non-coated roller can include a roller without additional coatings. In some examples, the additional coatings can cause the speed of the print media to be less consistent than a non-coated roller. In some examples, the turn roller 304 can be an ethylene propylene diene monomer (EPDM) rubber roller. By utilizing a relatively smaller turn roller 304 additional cost can be saved by not having to utilize an additional coating. In addition, utilizing a relatively smaller turn roller 304 can provide a more compact printing device and/or smaller printing device footprint.

Figure 4:
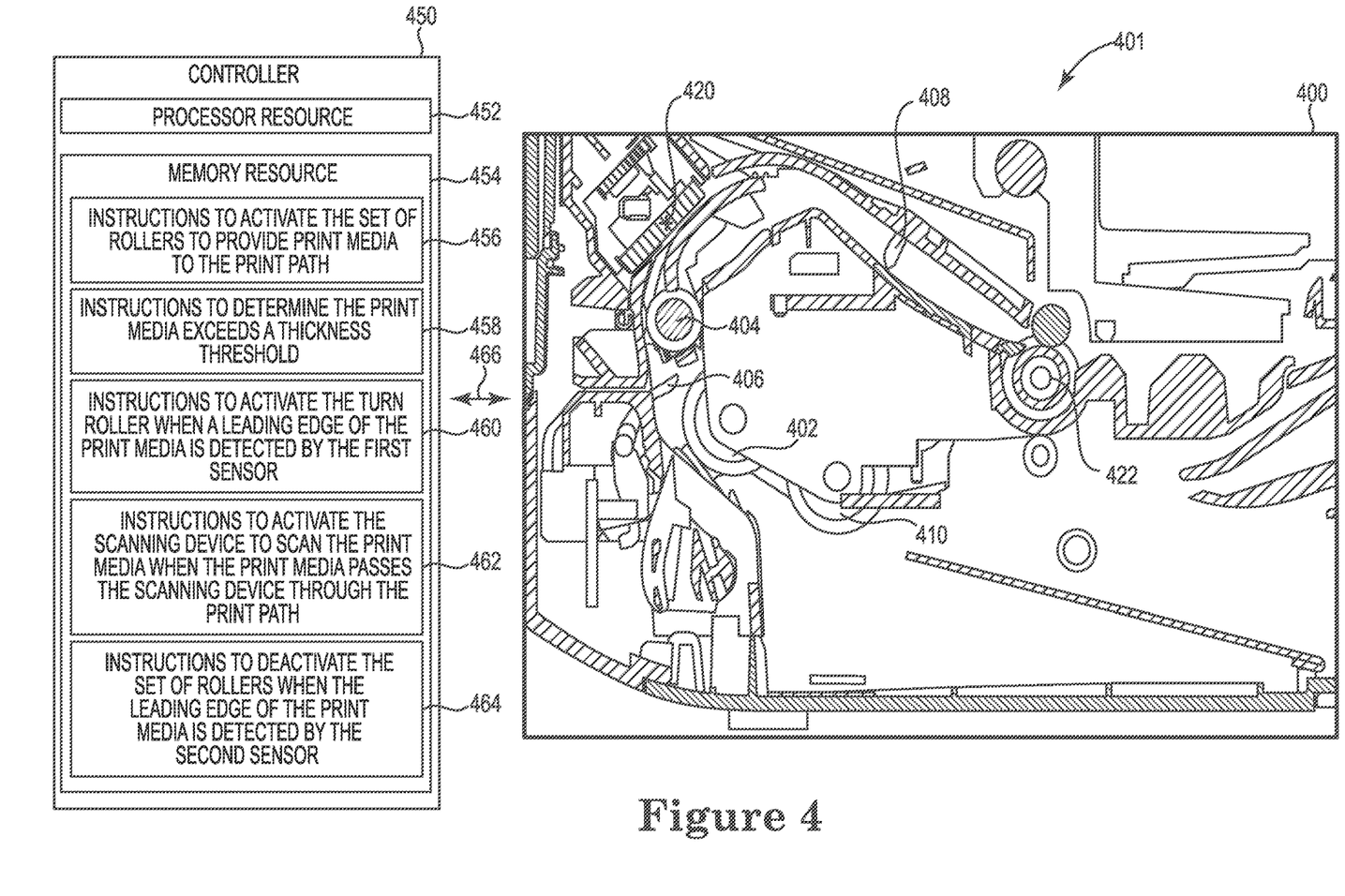
FIG. 4 illustrates an example of a system that utilizes print media rollers, in accordance with the present disclosure.

FIG. 4 illustrates an example of a system 401 that utilizes print media rollers, in accordance with the present disclosure. In some examples, the system 401 can include a device 400. The device 400 can include the same or similar elements as device 300 as referenced in FIG. 3, device 200 as referenced in FIG. 2, and/or device 100 as referenced in FIG. 1. For example, the device 400 can include a pick roller 410, a separation roller 402, a turn roller 404, a feed roller 422, a first sensor 406, and/or a second sensor 408. In some examples, the system 401 can include a controller 450 communicatively coupled to elements of the device 400 through a communication path 466. As used herein, a communication path 466 can include wired or wireless pathways that can be utilized to transfer information and/or data.

In some examples, the controller 450 can include a processor resource 452 communicatively coupled to a memory resource 454. As described further herein, the memory resource 454 can include instructions 456, 458, 460, 462, 464 that can be executed by the processor resource 452 to perform particular functions. In some examples, the processor resource 452 may be a central processing unit (CPU), a semiconductor-based microprocessor, and/or other hardware devices suitable for retrieval and execution of non-transitory machine-readable instructions. In some examples, the controller 450 can be associated with a plurality of components. For example, the controller 450 can be utilized to activate drive motors, deactivate drive motors, activate clutch devices, activate scanning devices, and/or provide functions associated with a printing device. In some examples, the controller 450 can be local or remote to the plurality of components and/or printing device.

In some examples, the controller 450 can include instructions 456, 458, 460, 462, 464 stored on a machine-readable medium (e.g., memory resource 454, non-transitory computer-readable medium, etc.) and executable by a processor resource 452. In a specific example, the controller 450 can utilize a non-transitory computer-readable medium storing instructions 456, 458, 460, 462, 464 that, when executed, cause the processor resource 452 to perform corresponding functions.

The memory resource 454 may be electronic, magnetic, optical, or other physical storage device that stores executable instructions. Thus, non-transitory machine readable medium (e.g., a memory resource 454) may be, for example, a non-transitory machine readable medium (MRM) comprising Random-Access Memory (RAM), an Electrically-Erasable Programmable ROM (EEPROM), a storage drive, an optical disc, and the like. The non-transitory machine readable medium (e.g., a memory resource 454) may be disposed within the controller 450 and/or computing device. In this example, the executable instructions 456, 458, 460, 462, 464 can be "installed" on the device. Additionally, and/or alternatively, the non-transitory machine readable medium (e.g., a memory resource 454) can be a portable, external or remote storage medium, for example, that allows a computing system to download the instructions 456, 458, 460, 462, 464 from the portable/external/remote storage medium. In this situation, the executable instructions may be part of an "installation package". As described herein, the non-transitory machine readable medium (e.g., a memory resource 454) can be encoded with executable instructions for transporting relatively thick print media through a turn of a print media path.

In some examples, the controller 450 can include instructions 456 that can be executed by a processor resource 452 to activate the set of rollers (e.g., pick roller 410 and separation roller 402, etc.) to provide print media to the print media path. As described herein, activating the set of rollers can include activating a first drive motor. In some examples, activating the first drive motor can include activating the set of rollers when the pick roller 410 and separation roller 402 are coupled to the first drive motor.

In some examples, the controller 450 can include instructions 458 that can be executed by a processor resource 452 to determine the print media exceeds a thickness threshold. In some examples, the system 401 can include a device to determine a type or thickness of the print media within a print media tray. In some examples, a user can select a thickness or type of print media positioned within the print media tray. In other examples, a media type detection device can be utilized to analyze the print media to determine a thickness of the print media. In some examples, the thickness threshold can be determined based on an angle of a curve or turn of the print media path. For example, a tighter or lower angled turn can be more difficult to move relatively thicker print media. In this example, the angle of the turn can be utilized to determine when the turn roller 404 may be utilized to ensure the print media can be transported through the turn of the print media path.

In some examples, the controller 450 can include instructions 460 that can be executed by a processor resource 452 to activate the turn roller 404 when a leading edge of the print media is detected by the first sensor 406. As described herein, the first sensor 406 can be a proximity sensor that can detect the presence or absence of print media within the print media path. In some examples, the first sensor 406 can send a signal to the controller 450 through the communication path 466 when the leading edge of the print media is detected.

In some examples, the controller 450 can include instructions 462 that can be executed by a processor resource 452 to activate the scanning device 420 to scan the print media when the print media passes the scanning device 420 through the print media path. In some examples, the controller 450 can activate the scanning device 420 when the first sensor 406 detects the leading edge of the print media. As described herein, the scanning device 420 can be utilized to scan the print media and generate a digital image of the print media. In some examples, other devices can be positioned to replace the scanning device 420. For example, other types of sensors or monitoring devices can be utilized to replace the scanning device 420. In some examples, the scanning device 420 can generate digital information related to the print media and transfer the digital information to the controller 450 through the communication path 466.

In some examples, the controller 450 can include instructions 464 that can be executed by a processor resource 452 to deactivate the set of rollers when the leading edge of the print media is detected by the second sensor 408. As described herein, the second sensor 408 can be positioned at an exit of the turn or corner of the print media path. In some examples, the second sensor 408 can send a signal to the controller 450 through the communication path 466. In some examples, the controller 450 can deactivate the pick roller 410 and/or separation roller 402 prior to the leading edge of the print media reaching a feed roller 422. As described herein, the print media can damage the print media when the feed roller 422 and set of rollers simultaneously interact with the print media. In some examples, the controller 450 can deactivate the set of rollers by initiating a clutch device to allow the pick roller 410 and separation roller 402 to spin freely. In this way, the system 401 can be utilized to transport relatively thick print media through a turn or corner of a print media path more precisely and consistently.

Figure 5:
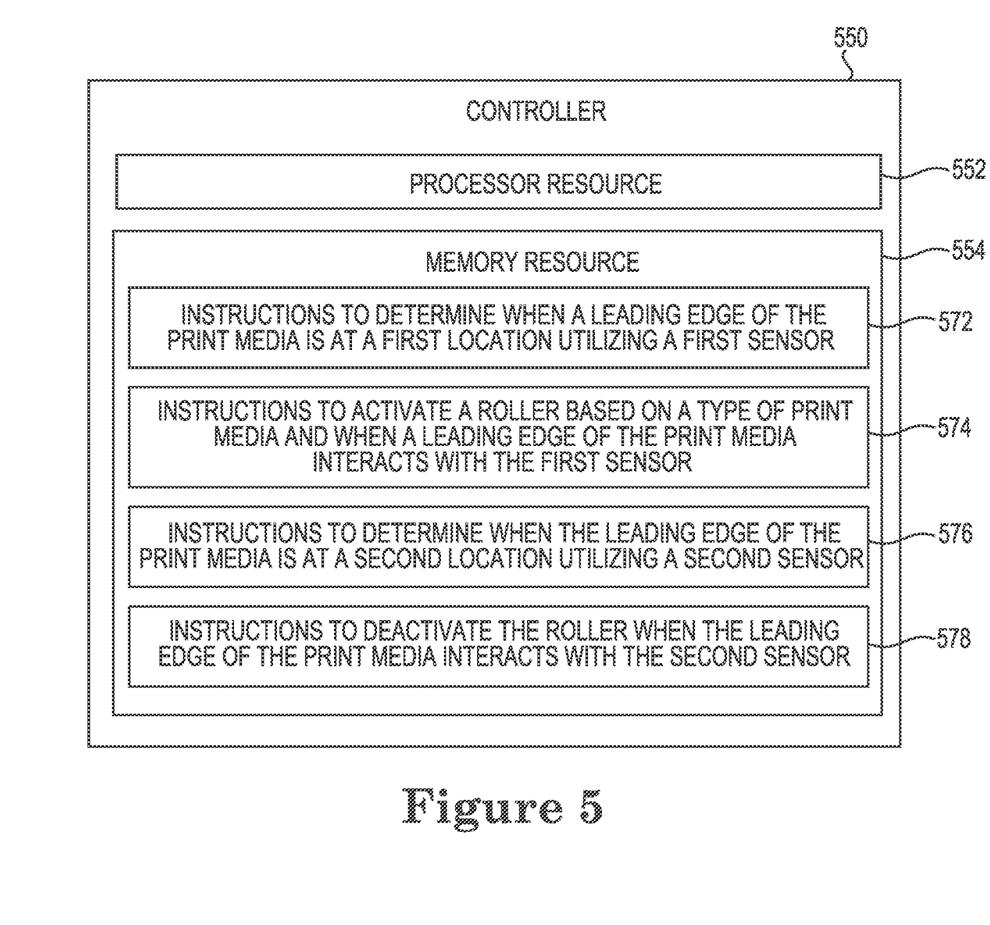
FIG. 5 illustrates an example of a controller, in accordance with the present disclosure.

FIG. 5 illustrates an example of a controller 550, in accordance with the present disclosure. In some examples, the controller 550 can be utilized to control functions of a printing device that includes a plurality of rollers that can be driven by motors. For example, the controller 550 can be communicatively coupled to a plurality of electrical devices, such as electric motors, to control the functions of the electrical devices.

As described herein, the controller 550 can include a processor resource 552 communicatively coupled to a memory resource 554. As described further herein, the memory resource 554 can include instructions 572, 574, 576, 578 that can be executed by the processor resource 552 to perform particular functions. In some examples, the controller 450 can include instructions 572, 574, 576, 578 stored on a machine-readable medium (e.g., memory resource 554, non-transitory computer-readable medium, etc.) and executable by a processor resource 552. In a specific example, the controller 550 can utilize a non-transitory computer-readable medium storing instructions 572, 574, 576, 578 that, when executed, cause the processor resource 552 to perform corresponding functions.

In some examples, the controller 550 can include instructions 572 that can be executed by a processor resource 552 to determine when a leading edge of the print media is at a first location utilizing a first sensor. As described herein, the first sensor can be positioned within a printing device to provide a signal to the controller 550 when the leading edge of the print media interacts with the first sensor. In this way, the controller 550 can determine when the print media is at the first location. In some examples, the first location can be a beginning of a turn or curve of the print media path.

In some examples, the controller 550 can include instructions 574 that can be executed by a processor resource 552 to activate a roller based on a type of print media and when a leading edge of the print media interacts with the first sensor. In some examples, the roller can be a turn roller as described herein. For example, the roller can be positioned within a turn or curve of the print media path. In these examples, the roller can be activated to help move print media through the turn or curve of the print media path.

In some examples, the controller 550 can include instructions 576 that can be executed by a processor resource 552 to determine when the leading edge of the print media is at a second location utilizing a second sensor. In some examples, the second sensor can be utilized to determine when a leading edge of the print media has exited the turn or curve of the print media path and is entering a straight or substantially straight portion of the print media path. In some examples, the second sensor can be a similar sensor as the first sensor that is positioned at the exit of the turn or curve of the print media path. In some examples, the second sensor can send a signal to the controller 550 when the leading edge of the print media interacts with the second sensor. In this way, the controller 550 can determine when the leading edge of the print media has exited the turn or curve of the print media path.

In some examples, the controller 550 can include instructions 578 that can be executed by a processor resource 552 to deactivate the roller when the leading edge of the print media interacts with the second sensor. In some examples, the controller 550 can determine when the print media has exited the turn or curve of the print media path and deactivate the roller. In some examples, the controller 550 can deactivate the turn roller, separation roller, and/or the pick roller. In some examples, the controller 550 can deactivate the roller by utilizing a clutch mechanism to allow the roller to spin freely. As described herein, the leading edge of the print media can interact with a different roller after interacting with the second sensor. In some examples, the print media can be damaged when the separation roller and the different roller simultaneously interact with the print media. In this way, the controller 550 can deactivate the roller to prevent damage to the print media.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A device, comprising:
   a first roller to receive print media;
   a first sensor to determine when a leading edge of the print media is at a first location;
   a second roller to be activated based on a type of the print media and when the leading edge of the print media interacts with the first sensor;
   a second sensor to determine when the leading edge of the print media is at a second location, wherein the first roller is deactivated based on when the leading edge of the print media interacts with the second sensor.

2. The device of claim 1, wherein the second roller is activated based on a determination of a first type of print media and not activated based on a determination of a second type of print media.

3. The device of claim 2, wherein the first type of media exceeds a thickness threshold and the second type of media is less than the thickness threshold.

4. The device of claim 1, wherein the first sensor is positioned at a start of a corner of a print media path and the second sensor is positioned at an end of the corner of the print media path.

5. The device of claim 4, wherein the corner includes an inline scanning device positioned between the second roller and the second sensor.

6. The device of claim 1, wherein the first roller remains activated when the second roller is activated.

7. The device of claim 1, wherein the second roller is to provide the print media past a scanning device at a particular speed.

8. A printing device, comprising:
   a first roller coupled to a first drive motor to be activated to move print media along a print media path;
   a first sensor at a first location of the print media path to determine when a leading edge of the print media is at the first location of the print media path;
   a second roller coupled to a second drive motor to be activated to move the print media along the print media path when the print media is a particular type of print media and the print media is sensed by the first sensor; and
   a second sensor at a second location of the print media path to determine when the leading edge of the print media is at the second location the print media path, wherein the first drive motor is deactivated based on when the leading edge of the print media interacts with the second sensor.

9. The printing device of claim 8, wherein the first drive motor and second drive motor are active in parallel.

10. The printing device of claim 8, wherein the first roller is a first size and the second roller is a second size that is smaller than the first size.

11. The printing device of claim 8, comprising a media type sensor to determine when the print media is the particular type of print media, wherein the particular type of print media exceeds a thickness threshold.

12. The printing device of claim 8, wherein the first roller is positioned between the first sensor and a print media tray storing print media and the second roller is positioned between the first sensor and the second sensor.

13. A system, comprising:
   a print media path between a print media tray and a print zone;
   a set of rollers coupled to a first motor;
   a turn roller coupled to a second motor;
   a first sensor positioned between the set of rollers and the turn roller;
   a second sensor positioned between the turn roller and a feed roller;
   a scanning device positioned inline with the print media path between the turn roller and the second sensor; and
   a controller, comprising instructions to:
      activate the set of rollers to provide print media to the print media path;
      determine the print media exceeds a thickness threshold;
      activate the turn roller when a leading edge of the print media is detected by the first sensor;
      activate the scanning device to scan the print media when the print media passes the scanning device through the print media path; and
      deactivate the set of rollers when the leading edge of the print media is detected by the second sensor.

14. The system of claim 13, wherein the controller includes instructions to activate the scanning device when the leading edge of the print media is detected by the first sensor.

15. The system of claim 13, wherein the set of rollers rotate at a first speed and the turn roller rotates at a second speed that is greater than the first speed.

\* \* \* \* \*